(12) United States Patent
Kohtani

(10) Patent No.: US 12,123,943 B2
(45) Date of Patent: Oct. 22, 2024

(54) RADAR DEVICE

(71) Applicants: DENSO CORPORATION, Kariya (JP); MIRISE Technologies Corporation, Nisshin (JP); TOYOTA JIDOSHA KABUSHIKI KAISHA, Toyota (JP)

(72) Inventor: Masato Kohtani, Nisshin (JP)

(73) Assignees: DENSO CORPORATION, Kariya (JP); MIRISE Technologies Corporation, Nisshin (JP); TOYOTA JIDOSHA KABUSHIKI KAISHA, Toyota (JP)

(*) Notice: Subject to any disclaimer, the term of this patent is extended or adjusted under 35 U.S.C. 154(b) by 444 days.

(21) Appl. No.: 17/463,072

(22) Filed: Aug. 31, 2021

(65) Prior Publication Data
US 2022/0107408 A1 Apr. 7, 2022

(30) Foreign Application Priority Data
Oct. 1, 2020 (JP) .................................. 2020-166976

(51) Int. Cl.
*G01S 13/931* (2020.01)
*G01S 7/03* (2006.01)
*G01S 13/02* (2006.01)

(52) U.S. Cl.
CPC .............. *G01S 13/931* (2013.01); *G01S 7/03* (2013.01); *G01S 2013/0245* (2013.01)

(58) Field of Classification Search
None
See application file for complete search history.

(56) References Cited

U.S. PATENT DOCUMENTS

| | | | | |
|---|---|---|---|---|
| 3,042,914 A | * | 7/1962 | Van Atta | G01S 7/06 342/149 |
| 6,622,308 B1 | * | 9/2003 | Raiser | H04N 7/106 348/731 |
| 8,106,755 B1 | * | 1/2012 | Knox | G01S 13/867 340/439 |
| 9,116,227 B2 | | 8/2015 | Lee et al. | |
| 10,446,938 B1 | * | 10/2019 | Wang | H01Q 9/0407 |

(Continued)

FOREIGN PATENT DOCUMENTS

| | | |
|---|---|---|
| JP | H05-027007 A | 2/1993 |
| JP | 2000-101464 A | 4/2000 |

(Continued)

OTHER PUBLICATIONS

Wang et al., "Multi-Mode Image Radar System and Its Challenges", Texas Instruments, WSM-3, IMS, 2019.

*Primary Examiner* — Bernarr E Gregory
*Assistant Examiner* — Brandon James Henson
(74) *Attorney, Agent, or Firm* — Posz Law Group, PLC

(57) ABSTRACT

A radar device for a vehicle includes: two or more receiving channels, each of which includes a mixer. At least one or more of the receiving channels includes: a phased array antenna divided into at least two or more branches to provide sub-array antenna elements; and a first phase shifter and a variable gain amplifier as a high frequency unit disposed between each of the sub-array antenna elements and the mixer. A numerical number of the sub-array antenna elements is equal to or more than a numerical number of the high-frequency units.

9 Claims, 13 Drawing Sheets

(56) References Cited

U.S. PATENT DOCUMENTS

| | | | |
|---|---|---|---|
| 10,917,132 B1* | 2/2021 | Wyse | H04B 1/0475 |
| 2003/0007450 A1* | 1/2003 | Ohtaki | H04B 7/084 |
| | | | 370/208 |
| 2004/0027268 A1 | 2/2004 | Langsford | |
| 2013/0214961 A1 | 8/2013 | Lee et al. | |
| 2015/0276919 A1* | 10/2015 | Matsumura | H01Q 1/3233 |
| | | | 342/368 |
| 2015/0355313 A1 | 12/2015 | Li et al. | |
| 2018/0115282 A1* | 4/2018 | Thyagarajan | H03G 3/3042 |
| 2018/0182246 A1 | 6/2018 | Baba et al. | |
| 2019/0170857 A1* | 6/2019 | Nakajima | G01S 13/931 |
| 2020/0136599 A1 | 4/2020 | Savary et al. | |
| 2021/0159594 A1* | 5/2021 | Tiebout | H01Q 5/385 |
| 2021/0160705 A1* | 5/2021 | Zimmerman | H01Q 5/40 |
| 2021/0208243 A1 | 7/2021 | Kohtani | |
| 2022/0407225 A1 | 12/2022 | Kohtani | |

FOREIGN PATENT DOCUMENTS

| | | |
|---|---|---|
| JP | 2008-309744 A | 12/2008 |
| JP | 2016-167769 A | 9/2016 |
| JP | 2017-75839 A | 4/2017 |
| JP | 2019-149684 A | 9/2019 |

* cited by examiner

RADAR DEVICE

CROSS REFERENCE TO RELATED APPLICATION

The present application claims the benefit of priority from Japanese Patent Application No. 2020-166976 filed on Oct. 1, 2020. The entire disclosure of the above application is incorporated herein by reference.

TECHNICAL FIELD

The present disclosure relates to a radar device.

BACKGROUND

In recent years, many technologies such as collision prevention and autonomous driving have been proposed, and using radar technology, the technologies for the distance from the own device to the target, the relative velocity to the target, and the existence angle of the target (i.e., the arrival angle of the radar received wave) are required. The inventors have proposed a millimeter-wave band radar system for a mobile body as a device for measuring the distance from the own device to the target, the relative velocity to the target, and the existence angle of the target.

SUMMARY

According to an example, a radar device may include: two or more receiving channels, each of which includes a mixer. At least one or more of the receiving channels includes: a phased array antenna divided into at least two or more branches to provide sub-array antenna elements; and a first phase shifter and a variable gain amplifier as a high frequency unit disposed between each of the sub-array antenna elements and the mixer. A numerical number of the sub-array antenna elements is equal to or more than a numerical number of the high-frequency units.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
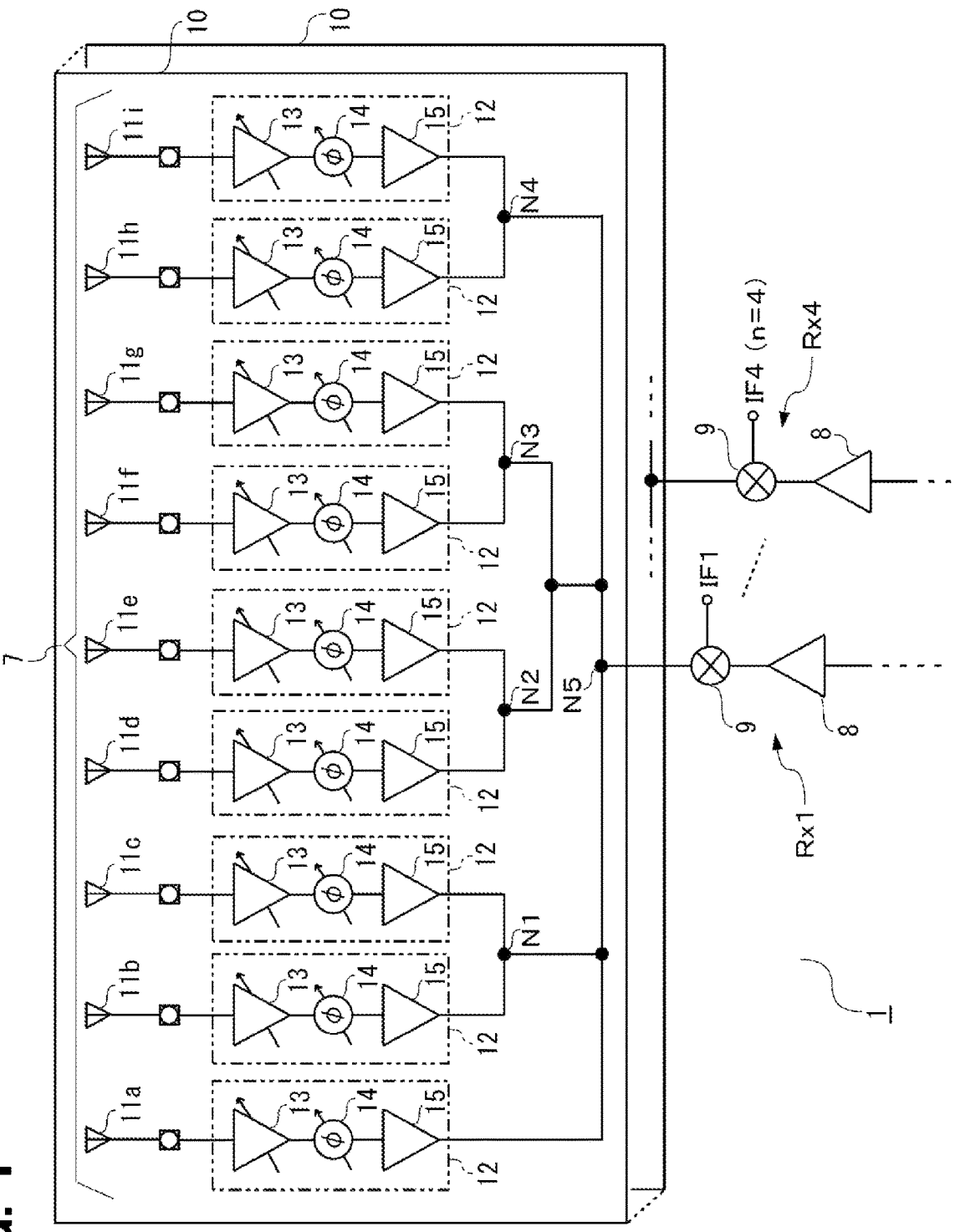
FIG. 1 is an electrical configuration diagram of a receiving phased subarray unit according to the first embodiment.

A millimeter-wave radar system uses a phased array receiver to accurately determine the direction in which a target is present (for example, in a conceivable technique). According to the radar described in the conceivable technique, a phased array antenna is provided exclusively for reception, and each of the radars has two or more reception channels with a mixer. The receiving antennas are collectively configured in a sub-array, and each sub-array supplies a sub-array signal to a mixer to generate a mixer signal.

The digital beam forming unit forms a digital beam by executing a digital beam forming algorithm by a processor. Thereby, it is possible to determine the virtual beam to be installed within the beam width of the received beam, which is narrower than the received beam.

When the phased array antenna is made into a sub-array by applying the above-mentioned conceivable technique, the number of mixers and the number of phase shifters are increased due to the system configuration. As the number of components of the mixer increases, the processing load for processing the output signal of the mixer increases and the power consumption also increases. When the number of components of the phase shifter is large, the number of control signals for controlling the phase shifter is also large, which is not desirable because the system becomes complicated.

The first object of the present embodiments is to reduce the power consumption while reducing the calculation processing load, and the second object is to provide a radar device with simplifying the system.

The disclosure describes a radar device for a vehicle provided with a phased array antenna specialized for reception. The radar device has two or more receive channels, each with a mixer. Further, at least one or more of the receiving channels has a phased array antenna including a sub-array antenna element having at least two branches or more. Further, in this receiving channel, a first phase shifter and a variable gain amplifier are configured as a high frequency section between each sub-array antenna element and the mixer, respectively.

Since one mixer can provide each receiving channel, the number of the elements in the mixer can be reduced, and the power consumption can be reduced while reducing the calculation processing load. When the number of sub-array antenna elements is larger than the number of components of the high-frequency section, the number of components of the high-frequency section including the first phase shifter can be reduced, and the system can be simplified.

Embodiments are described below with reference to the drawings. In each of the embodiments described below, the same or similar reference numerals are used to designate the same or similar configurations, and a description thereof will be omitted as necessary.

First Embodiment

FIG. 1 to FIG. 4 show explanatory views of the first embodiment. The vehicle radar device 1 illustrated in FIG.

Figure 3:
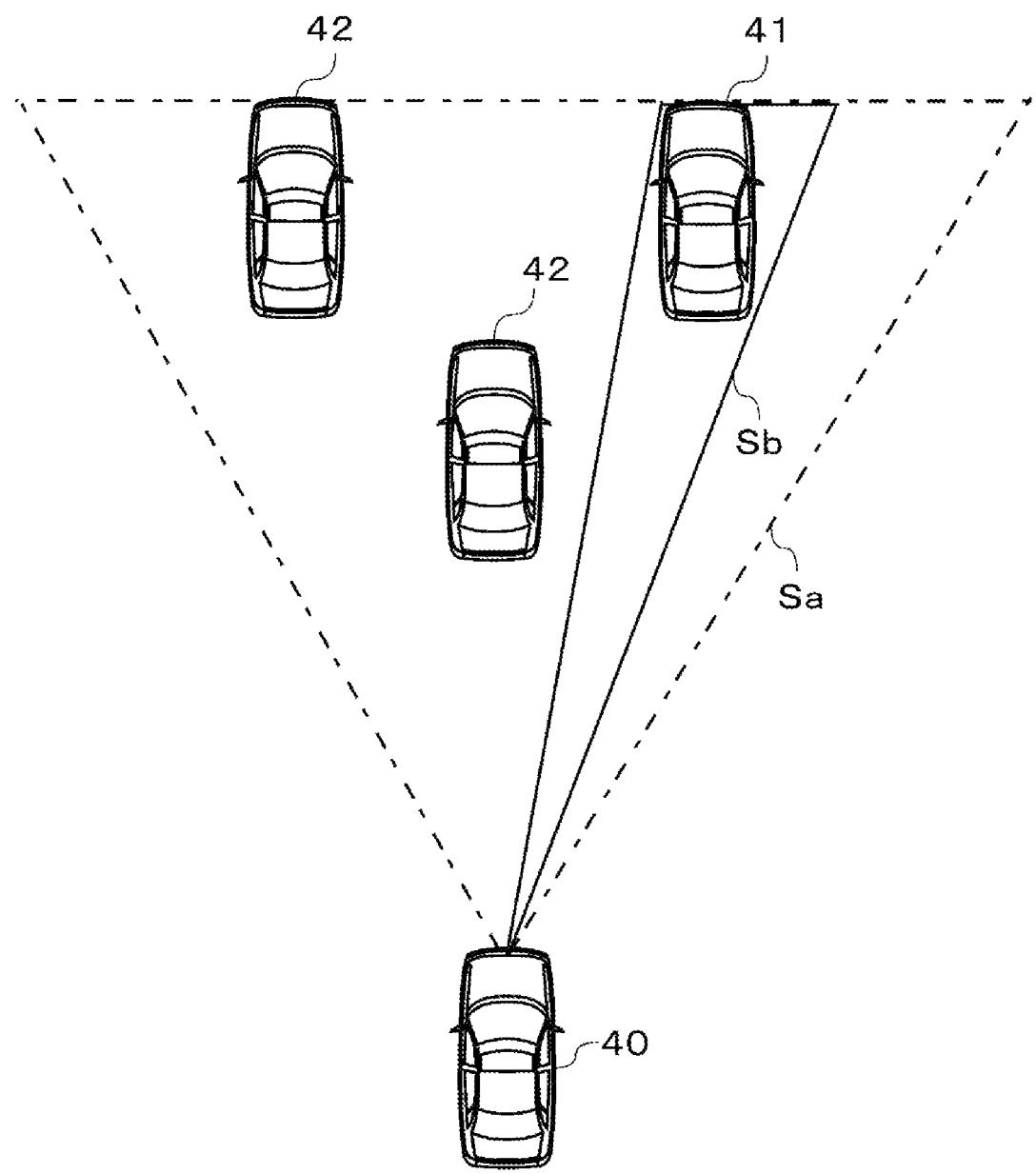
FIG. 3 is an explanatory diagram of a real beam and a virtual beam according to the first embodiment.

2 is configured as blocks of a control unit 2, a signal processing unit 3, a Phase Locked Loop (PLL) 4, a transmission unit 5, and a reception unit 6. The transmission unit 5 and the reception unit 6 are provided by blocks used in the millimeter wave band (from 76 GHz to 81 GHz). The radar device 1 is attached to the front end of the vehicle 40 as illustrated in FIG. 3, and is used for a long range radar (i.e., LRR) application that scans a predetermined range in front of about 200 m ahead of the vehicle. The [the] device 1 may be attached to a plurality of places on the front, rear, left and right of the vehicle 40.

In the present embodiment, since the configuration of the reception unit 6 is characterized, the description of the configuration of the transmission unit 5 will be skipped. Further, in the following example, an example in which the number of reception channels n is 4 and the reception channels Rx1, Rx2, Rx3, and Rx4 are set respectively will be described, but the number of reception channels n may be any number as long as it is two or more.

The radar device 1 for a vehicle includes a phased array antenna 7 specialized for reception. Further, each of the reception channel Rx1 to Rx4 includes one local (LO) amplifier 8, one mixer 9, and one receiving phased subarray unit 10.

As shown in FIG. 1, the phased array antenna 7 includes sub-array antenna elements 11a to 11i configured in two or more branches for all of the reception channels Rx1 to Rx4. The sub-array antenna elements 11a to 11i are provided by patch antennas for millimeter-wave radar. The reception phased sub-array unit 10 includes a plurality of sub-array antenna elements 11a to 11i in a sub-array with two or more branches, and synthesizes and mixes the received signals received through the plurality of sub-array antenna elements 11a to 11i in the sub-array to input the synthesized signal into the mixer 9. The sub-array antenna elements 11a to 11i are arranged side by side with the distance between adjacent elements set to λ/2, whereby the grating lobe can be suppressed and the side lobe can be suppressed. In the following description, the sub-array antenna elements 11a to 11i will be referred to as sub-array antenna elements 11 as necessary.

As shown in FIG. 1 as an example of branching of the sub-array antenna elements 11, high-frequency units 12 are configured in each signal receiving path from the sub-array antenna elements 11 to the mixer 9. The high frequency unit 12 is configured by connecting the variable gain amplifier 13, the first phase shifter 14, and the amplifier 15 in series from the sub-array antenna elements 11a to 11i to the mixer 9, respectively. In other words, the high frequency unit 12 constitutes a variable gain amplifier 13 between the first phase shifter 14 and the sub-array antenna elements 11a to 11i. By configuring the variable gain amplifier 13 between the sub-array antenna elements 11a to 11i and the first phase shifter 14, the Noise Figure (NF) on the system of the radar device 1 can be improved, and a distant target can be detected. The number of sub-array antenna elements 11a to 11i is the same as the number of components of the high-frequency unit 12. In this embodiment, the amplifier 15 is disposed in the high frequency unit 12, but the amplifier 15 may be provided as needed.

In the configuration example shown in FIG. 1, the reception phased sub-array unit 10 synthesizes the signals received from the sub-array antenna elements 11a to 11i divided into five blocks through the nodes N1 to N5 and outputs the signals to the mixer 9. Node N1 synthesizes the received signals received from the two sub-array antenna elements 11b and 11c. The node N2 synthesizes the received signals received from the two sub-array antenna elements 11d and 11e.

The node N3 synthesizes the received signals received from the two sub-array antenna elements 11f and 11g. The node N4 synthesizes the received signals received from the two sub-array antenna elements 11h and 11i. At node N5, the signals obtained through nodes N1 to N4 are combined and output to the mixer 9. The line lengths from the sub-array antenna elements 11a to 11i to the mixer 9 may be configured to be equal length paths to each other.

Figure 2:
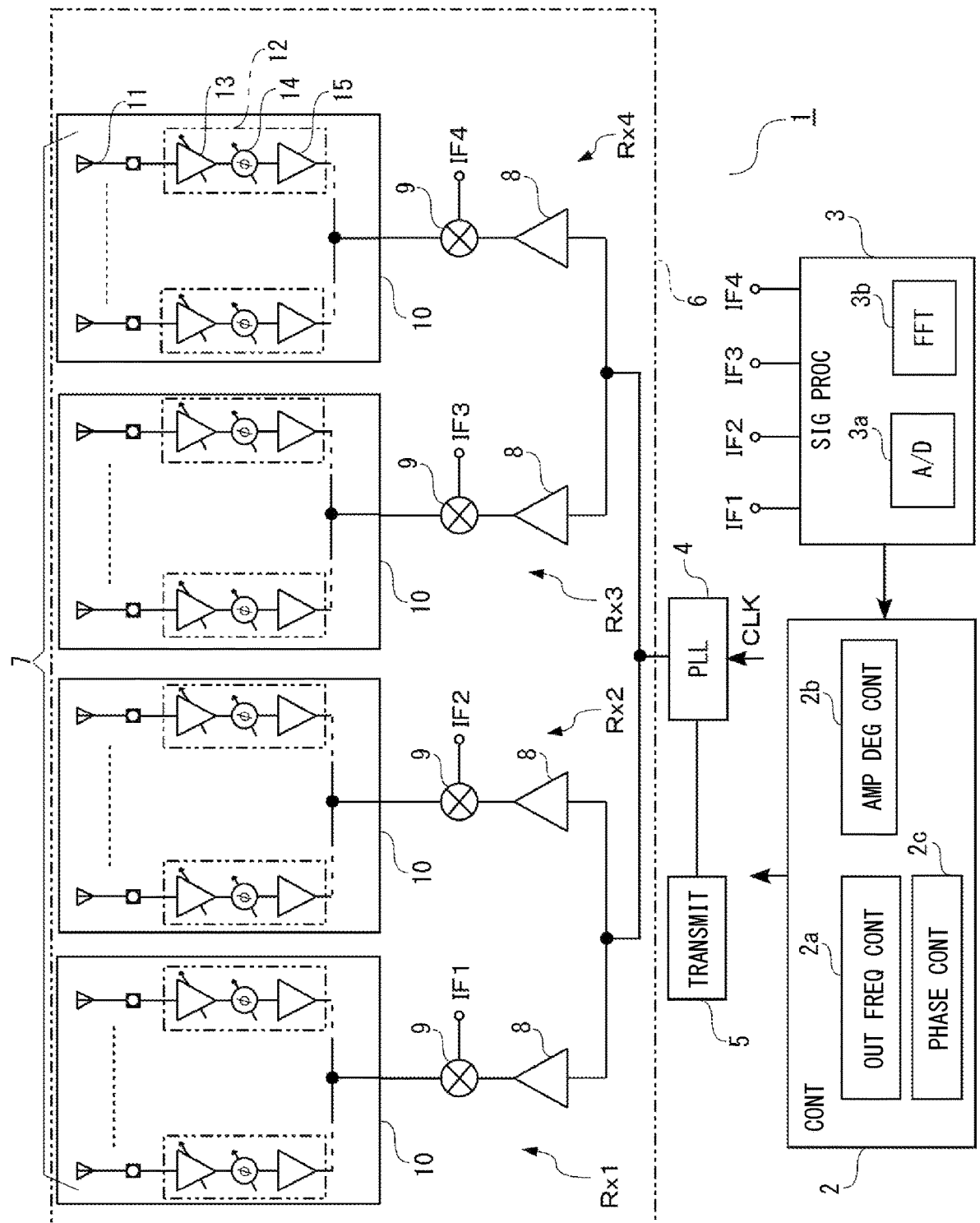
FIG. 2 is an electrical configuration diagram of a radar device according to the first embodiment.

The control unit 2 shown in FIG. 2 executes various control functions such as the output frequency control unit 2a, the amplification degree control unit 2b, and the phase control unit 2c by executing a predetermined control logic. The output frequency control unit 2a controls the output frequency of the PLL 4. The phase control unit 2c controls the phase shift value of the first phase shifter 14. The amplification degree control unit 2b controls the amplification degree of the variable gain amplifier 13.

The PLL 4 uses a reference clock CLK input from a reference oscillation circuit (not shown), and by adjusting parameters such as a multiple of the reference clock CLK, outputs a local signal (having, for example, 77 GHz) in the millimeter wave band having the same frequency to the mixer 9 in all reception channels Rx1 to Rx4. The mixer 9 can obtain an Intermediate Frequency (IF) output having a frequency proportional to the distance by mixing the local signal and the signal received by reflecting the radio wave output from the transmission unit 5 on the target. Although not described here, a multiplier may be provided to multiply the frequency to a desired frequency, and then the local signal may be output to each receiving channel Rx1 to Rx4.

The LO amplifier 8 amplifies the local signal of the PLL 4 with a predetermined amplification degree and outputs it to the mixer 9 in each reception channel Rx1 to Rx4. The mixer 9 of each reception channel Rx1 to Rx4 inputs and mixes the output signal of the reception phased subarray unit 10 of each reception channel Rx1 to Rx4 and the local signal amplified by the LO amplifier 8 as IF signals IF1 to IF4.

Since the same PLL 4 supplies the local signal to the mixer 9 of all the reception channels Rx1 to Rx4, the IF signal has a high correlation with the frequency variation of the reference clock CLK and the frequency characteristic change with respect to the external environment variation.

When the radar device 1 mounted on the vehicle 40 measures the distance to another vehicle 41, it receives a signal from the phased array antenna 7 using the receiving phased sub-array units 10 of the receiving channels Rx1 to Rx4. At this time, in each reception phased sub-array unit 10, the variable gain amplifier 13 amplifies the signal received from the sub-array antenna element 11, the first phase shifter 14 shifts the amplified signal of the variable gain amplifier 13, and then the amplifier 15 further amplifies the phase shift signal of the first phase shifter 14 and outputs it to the mixer 9.

The control unit 2 controls the directivity of the reception beam of the reception channels Rx1 to Rx4 by controlling the phase shift value (p of the first phase shifter 14 of each reception channel Rx1 to Rx4 using the phase control unit 2c. The received beam at this time is an actual beam having a predetermined beam width.

Further, the mixer 9 of each reception channel Rx1 to Rx4 outputs the output signal of each mixer 9 to the signal processing unit 3. The signal processing unit 3 includes a processor and a predetermined electronic control logic, and can estimate the angle of a target existing in a sector in which the field of view is narrowed by signal processing such as digital beam formation (DBF).

The signal processing unit 3 inputs the IF signal processed by the mixer 9 to the A/D converter 3a via an IF filter (not shown). The A/D converter 3a converts the IF signal into the digital data by an analog-digital conversion process. The signal processing unit 3 performs predetermined digital signal processing by the FFT 3b, and, as shown in FIG. 3, measures the distance from the own vehicle 40 to the other vehicle 41, the relative speed with the vehicle 41, and the existence angle of the vehicle 41.

Figure 4:
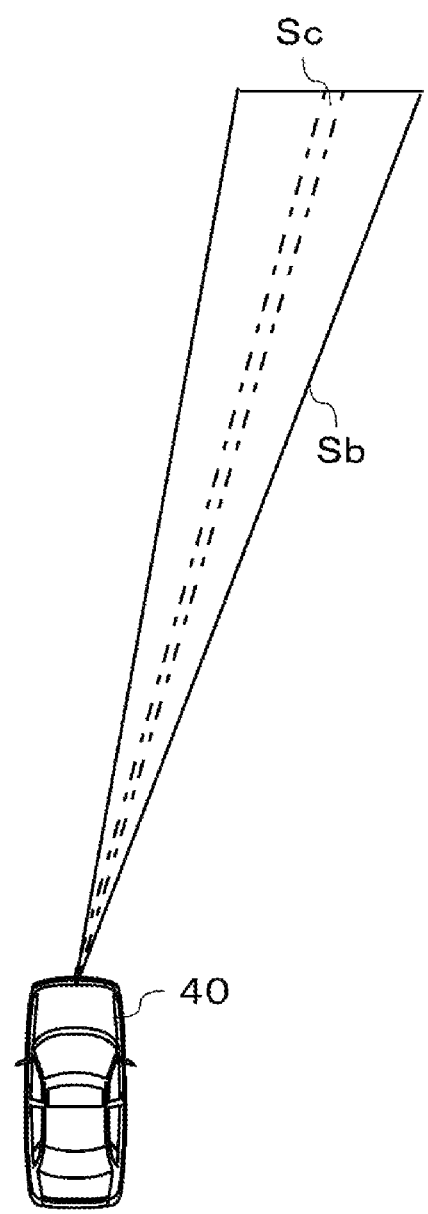
FIG. 4 is an explanatory diagram of a real beam and a virtual beam according to the first embodiment.

The signal processing unit 3 narrows the field of view into the sector region Sb shown in FIG. 3 by analog beamforming using the first phase shifter 14. By executing signal processing by the DBF algorithm, the signal processing unit 3 forms a narrow virtual beam Sc in the sector region Sb as shown in FIG. 4, and identifies the vehicle 41 with higher resolution as a scanning target. As a result, the other vehicle 42 can be excluded from the scanning target. Further, it is also possible to apply a multi-signal classification process (MUltiple SIgnal Classification, i.e., MUSIC) or the like, which can obtain a higher resolution than the DBF described above, for a plurality of targets.

For example, as illustrated in FIG. 4, the signal processing unit 3 uses the DBF algorithm to narrow the field of view to the sector area Sb instead of the entire wide angle field of view Sa, and acquires a virtual beam Sc for each sector area Sb. Therefore, the vehicle 41, which is a target, can be identified with high resolution in the narrow sector area Sb. Since the field of view can be narrowed down to the sector area Sb, the amount of calculation can be reduced as compared with the conceivable MIMO radar.

When the signal processing unit 3 calculates the existence angle of another vehicle 41 from the own vehicle 40, the digital data is fast Fourier transformed using FFT 3b, and the digital signal processing is executed to calculate the sum signal level Σ and the difference signal level Δ.

In the signal processing unit 3, the angle difference θ between the receiving direction of the received pulse beam and the existing direction of the target depends on the ratio of the sum signal level Σ and the difference signal level Δ as shown in the following equation (1), so that the unit 3 can measure using the mono-pulse method with utilizing the fact that the angle difference θ is a function of the ratio.

(Equation 1)

$$\theta = \sin^{-1}\left[\frac{\lambda}{\pi d} \cdot \tan^{-1}\left\{\mathrm{Im}\left(\left|\frac{\Delta}{\Sigma}\right|\right)\right\}\right] \quad (1)$$

As described above, according to the present embodiment, the first phase shifter 14 and the variable gain amplifier 13 are configured as the high frequency unit 12 between the sub-array antenna element 11 and the mixer 9, respectively, and the number of the sub-array antenna elements 11a to 11i is set to be the same as the number of components of the high frequency unit 12.

Since the mixer 9 is configured to be smaller than the number of sub-array antenna elements 11a to 11i, the number of mixers 9 can be reduced, and the calculation load of the IF signals IF1 to IF4 by the signal processing unit 3 is reduced while reducing the power consumption. The sub-array antenna elements 11a to 11i are arranged side by side with the distance between adjacent elements set to λ/2, whereby the grating lobe can be suppressed and the side lobe can be suppressed.

Second Embodiment

Figure 5:
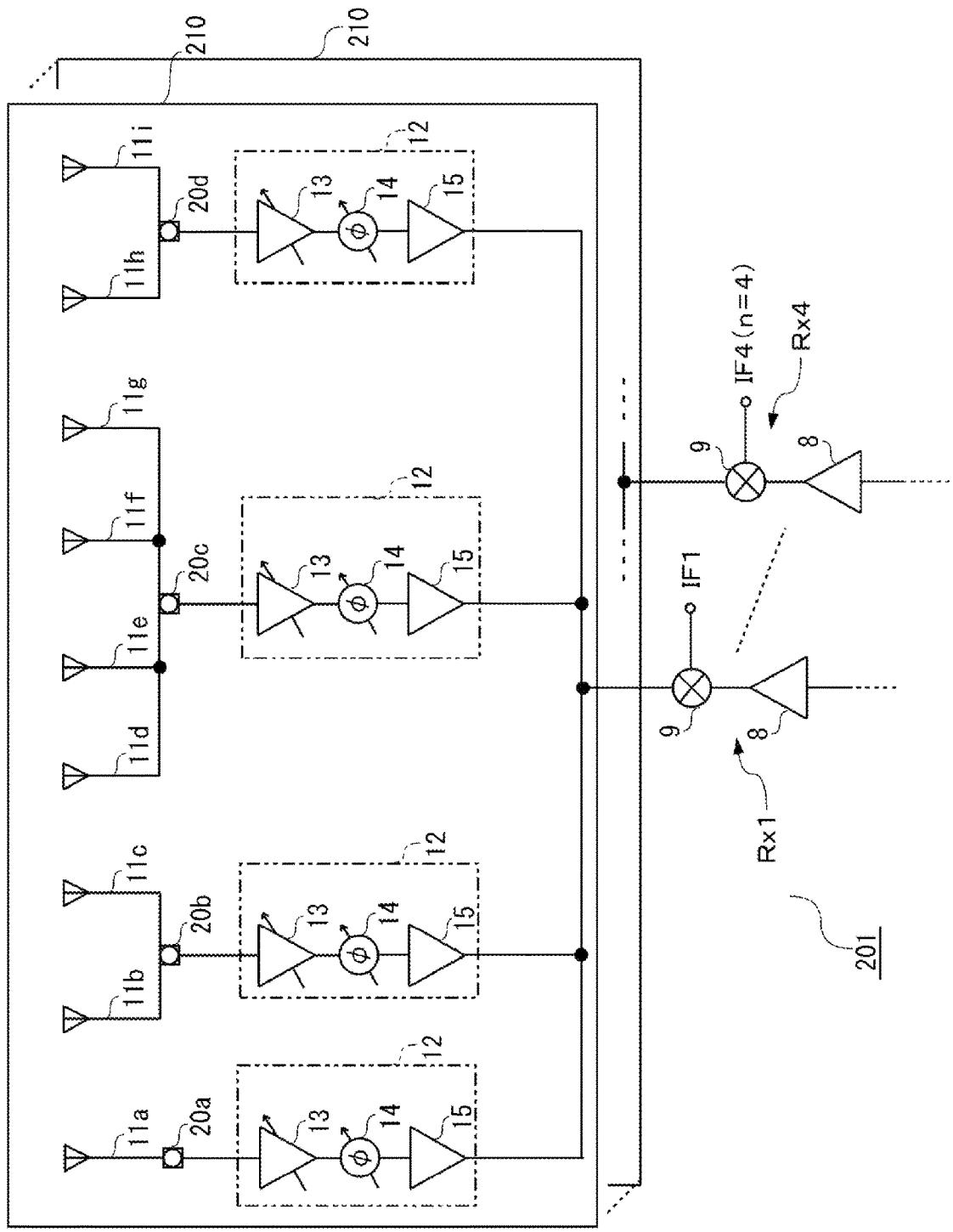
FIG. 5 is an electrical configuration diagram of a receiving phased subarray unit according to a second embodiment.

FIG. 5 shows an explanatory diagram of a second embodiment. FIG. 5 illustrates a part of the radar device 201. The receiving phased sub-array unit 210 includes PAD 20a to 20d connected to the high-frequency unit 12, and sub-array antenna elements 11a to 11i, respectively, where the numerical number of the sub-array antenna elements is equal to or more than the numerical number of the high-frequency units which is suitable for a random array design. The PAD 20a to 20d are also designed as couplers for the purpose of applying a self-diagnosis signal (or an on-chip test signal) through couplers to the high-frequency unit 12 (phase shifters), which is described in the embodiment later.

One PAD coupler 20b is connected between one high frequency unit 12 and the sub-array antenna elements 11b to 11c. The sub-array antenna elements 11b to 11c are divided into two parts from the PAD coupler 20b. The PAD coupler 20b is connected to the midpoint between the sub-array antenna elements 11b to 11c.

One PAD coupler 20c is connected between one high frequency unit 12 and the sub-array antenna elements 11d to 11g. The sub-array antenna elements 11d to 11g are branched into four parts from the PAD coupler 20c. The PAD coupler 20c is connected to the midpoint between the sub-array antenna elements 11d and 11g and is connected to the midpoint between the sub-array antenna elements 11e and 11f.

One PAD coupler 20d is connected between one high frequency unit 12 and the sub-array antenna elements 11h to 11i. The sub-array antenna elements 11h to 11i are bifurcated from the PAD coupler 20d. The PAD coupler 20d is connected to the midpoint between the sub-array antenna elements 11h to 11i.

Even in such an embodiment, the same effects as those in the above-described embodiment can be obtained. In the present embodiment, the number of sub-array antenna elements 11a to 11i is set to be larger than the number of components of the high-frequency unit 12. Thus, since the number of components of the high frequency unit 12 can be reduced from the number of components of the sub-array antenna elements 11a to 11i, the number of components of the first phase shifter 14 can be reduced, and the radar device 1 can be simplified.

Third Embodiment

Figure 6:
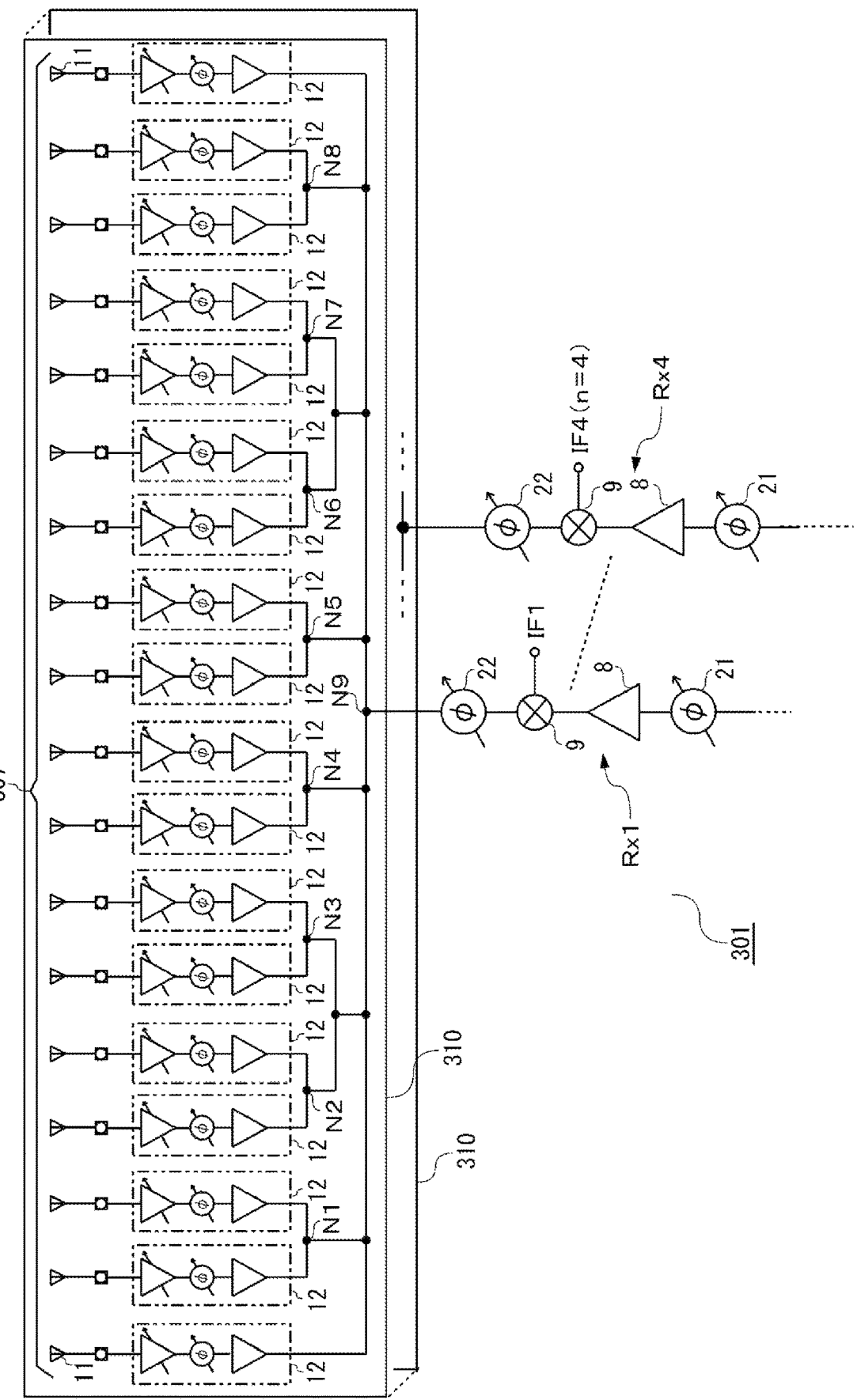
FIG. 6 is an electrical configuration diagram of a receiving phased subarray unit according to a third embodiment.
Figure 7:
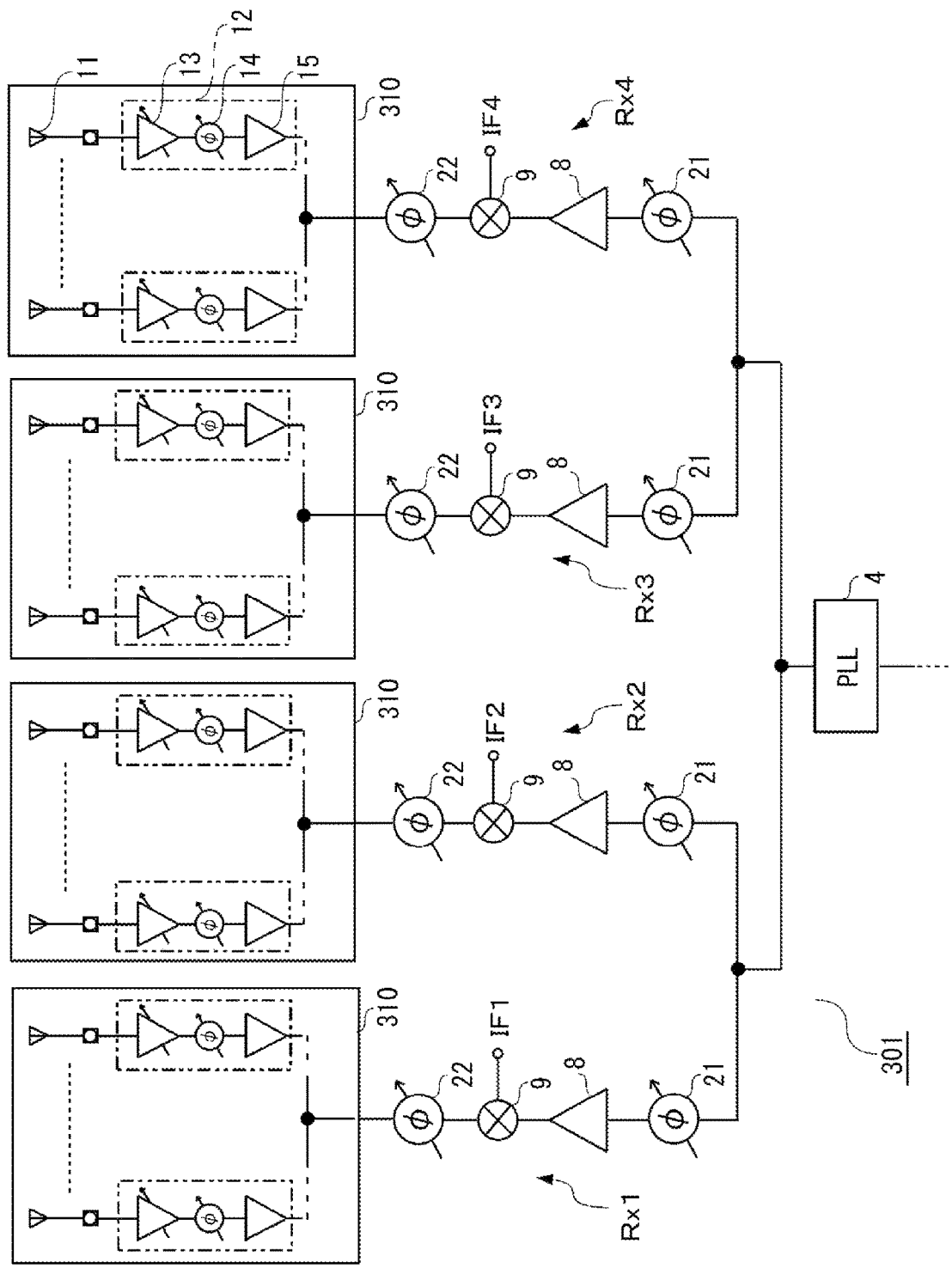
FIG. 7 is an electrical configuration diagram of a receiving unit according to a third embodiment.

FIGS. 6 and 7 are explanatory diagrams of a third embodiment. The radar device 301 shown in FIGS. 6 and 7 includes a reception phased subarray unit 310 for the number of reception channels. A large number of sub-array antenna elements 11 constituting the phased array antenna 307 are coupled at node N9 through individually provided high frequency units 12 and nodes N1 to N8, and the combined signal of the high frequency unit 12 is input into the mixer 9.

A third phase shifter 21 is configured between the high frequency unit 12 of each reception channel Rx1 to Rx4 and the mixer 9. A second phase shifter 22 is configured between the high frequency unit 12 of each reception channel Rx1 to Rx4 and the mixer 9. The second phase shifter 22 and the third phase shifter 21 are phase shifters configured so that the phase shift value can be changeable based on the control of the phase control unit 2c, and each shifter includes the transmission line (TML) (i.e., tunable TMLs) whose line length can be adjustable, a load phase shifter (i.e., a loaded type phase shifter), an inter-stage LC resonance matching circuit (i.e., an LC resonance in inter-stage matching network), and the like.

Although the second phase shifter 22 and the third phase shifter 21 do not require full rotation (i.e., 360 degree rotation), the shifter may have a simple structure with fine adjustment (i.e., fine phase tuning) may be possible within a specific phase shift range while keeping the loss as small as possible.

By providing the second phase shifter 22 and the third phase shifter 21 and adjusting the phase for each of the receiving channels Rx1 to Rx4, the measurement accuracy of the presence angle of the target using the sub-array antenna element 11 can be improved. Moreover, the calibration accuracy can be improved. The potential phase error between the IF signals of the receiving channels Rx1 to Rx4 can be reduced.

Fourth Embodiment

Figure 8:
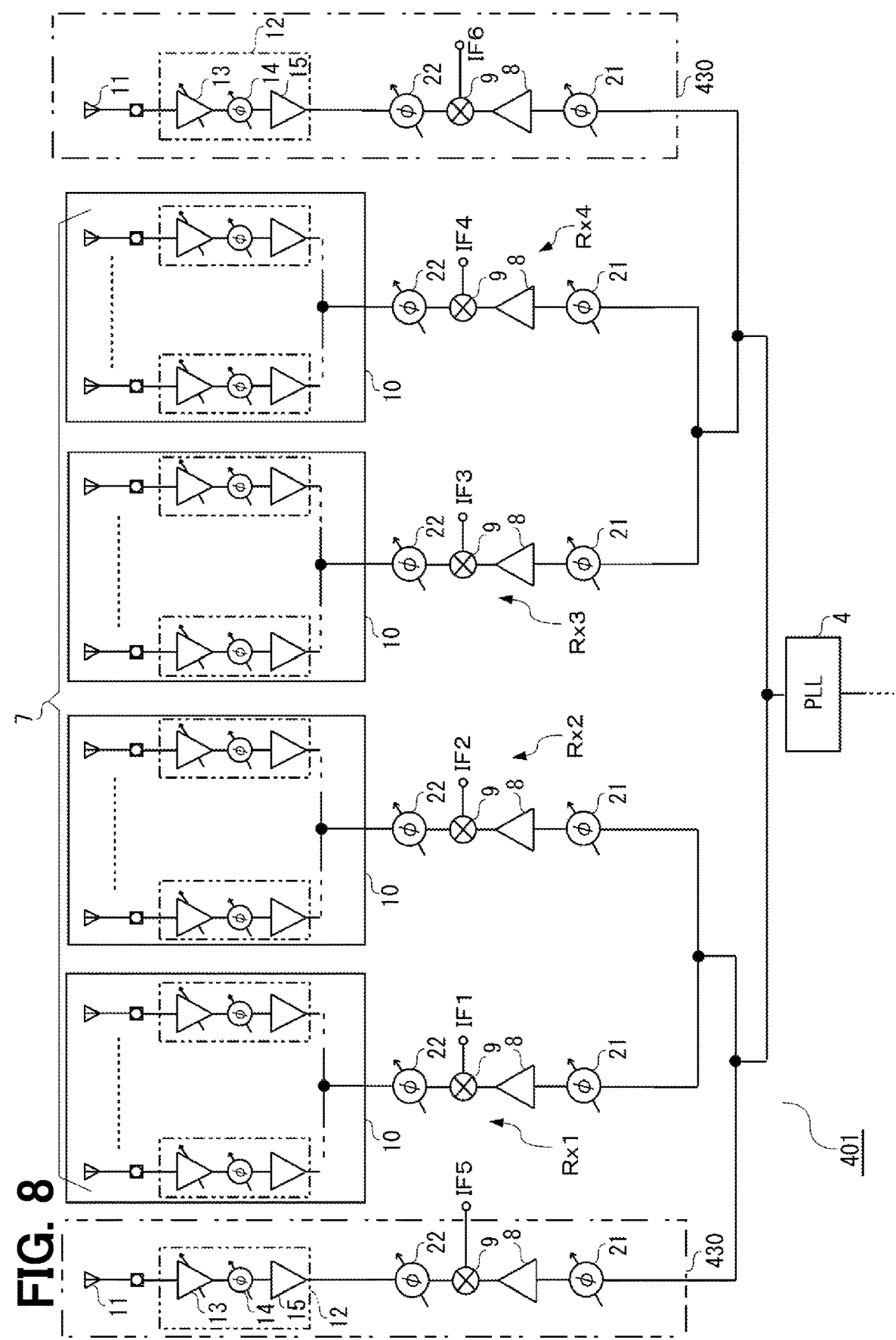
FIG. 8 is an electrical configuration diagram of a receiving unit according to a fourth embodiment.

FIG. 8 shows an explanatory diagram of a fourth embodiment. The radar device 401 shown in FIG. 8 includes guard channel units 430 at both ends of the reception phased subarray unit 10 in addition to the reception phased subarray unit 10 for the number of reception channels. The guard channel section 430 has an electrical configuration related to one sub-array antenna element 11, that has: a high frequency unit 12 including the variable gain amplifier 13, the first phase shifter 14, and the amplifier 15; a mixer 9; an LO amplifier 8; a second phase shifter 22; and a third phase shifter 21.

The guard channel unit 430 receives the received signal from the sub-array antenna 11 as a reference signal that serves as a signal reference for the phased array antenna 7, and cancels noise by superimposing the received signal on the main beams of the received channels Rx1 to Rx4, so that separation performance can be improved while increasing the resolution. Even in such a configuration, the same effect as that of the above-described embodiment can be obtained.

Fifth Embodiment

Figure 9:
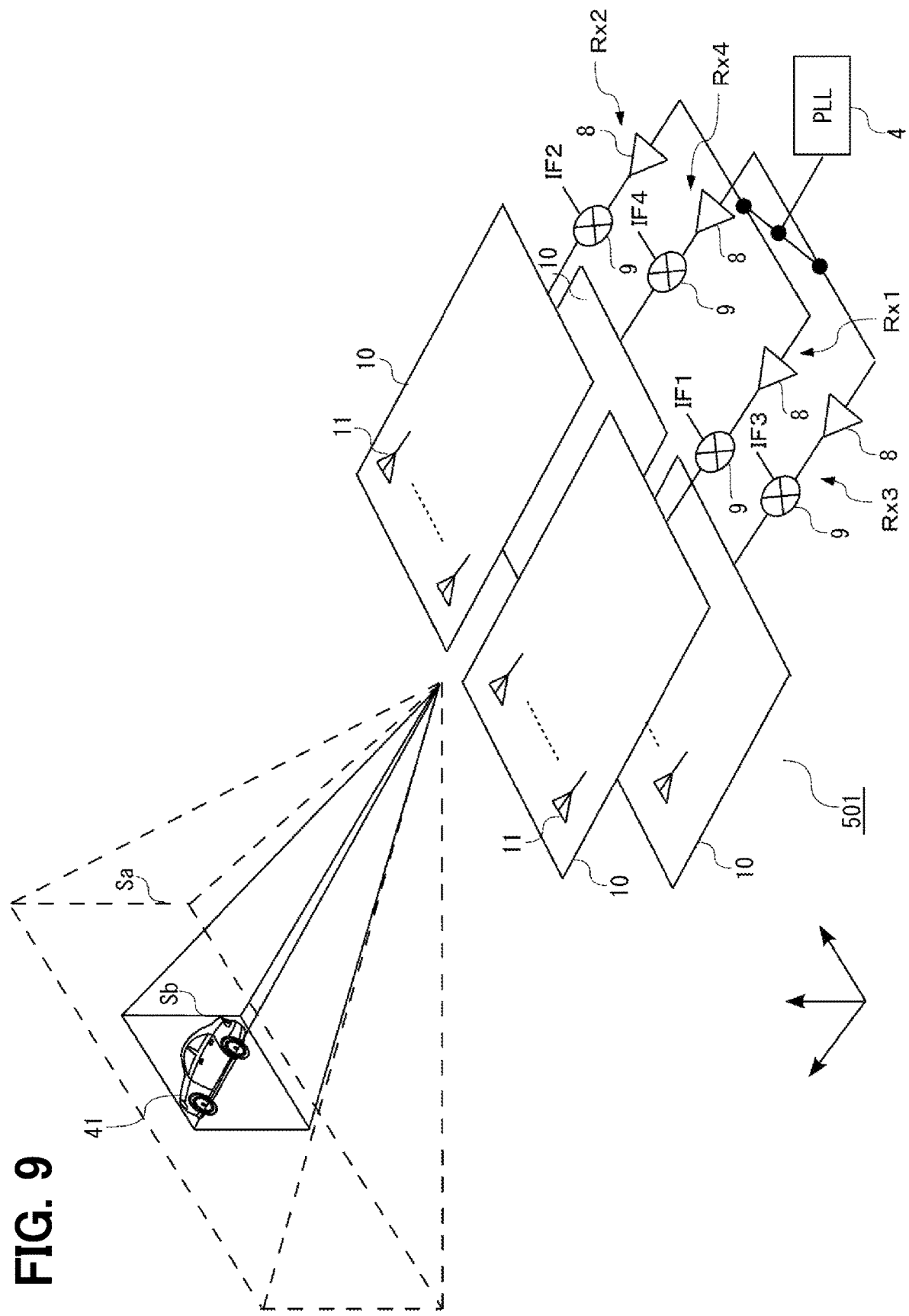
FIG. 9 is a schematic view showing an installation mode of a receiving unit according to a fifth embodiment.
Figure 10:
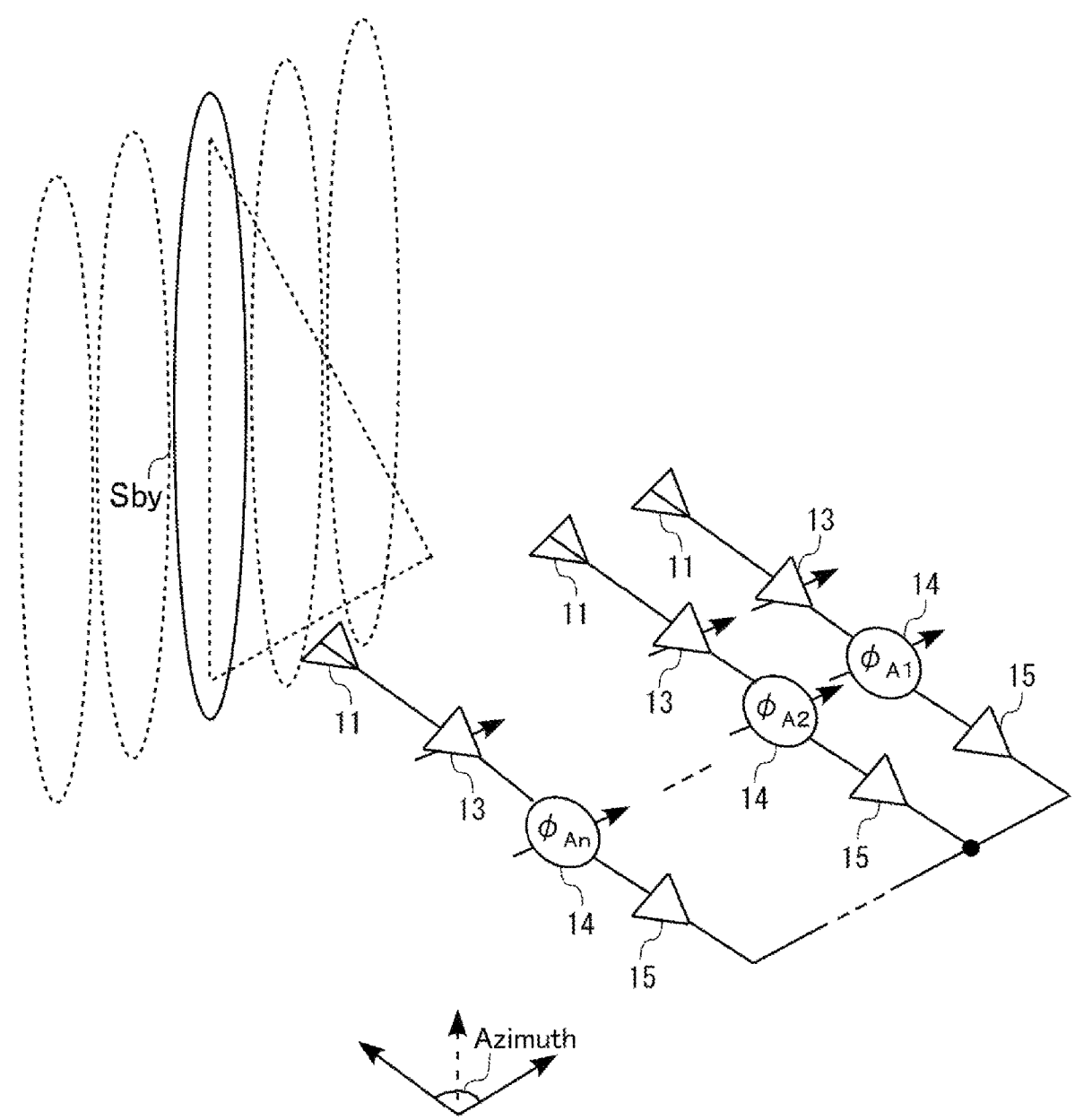
FIG. 10 is an explanatory diagram of a reception beam region according to a fifth embodiment.
Figure 11:
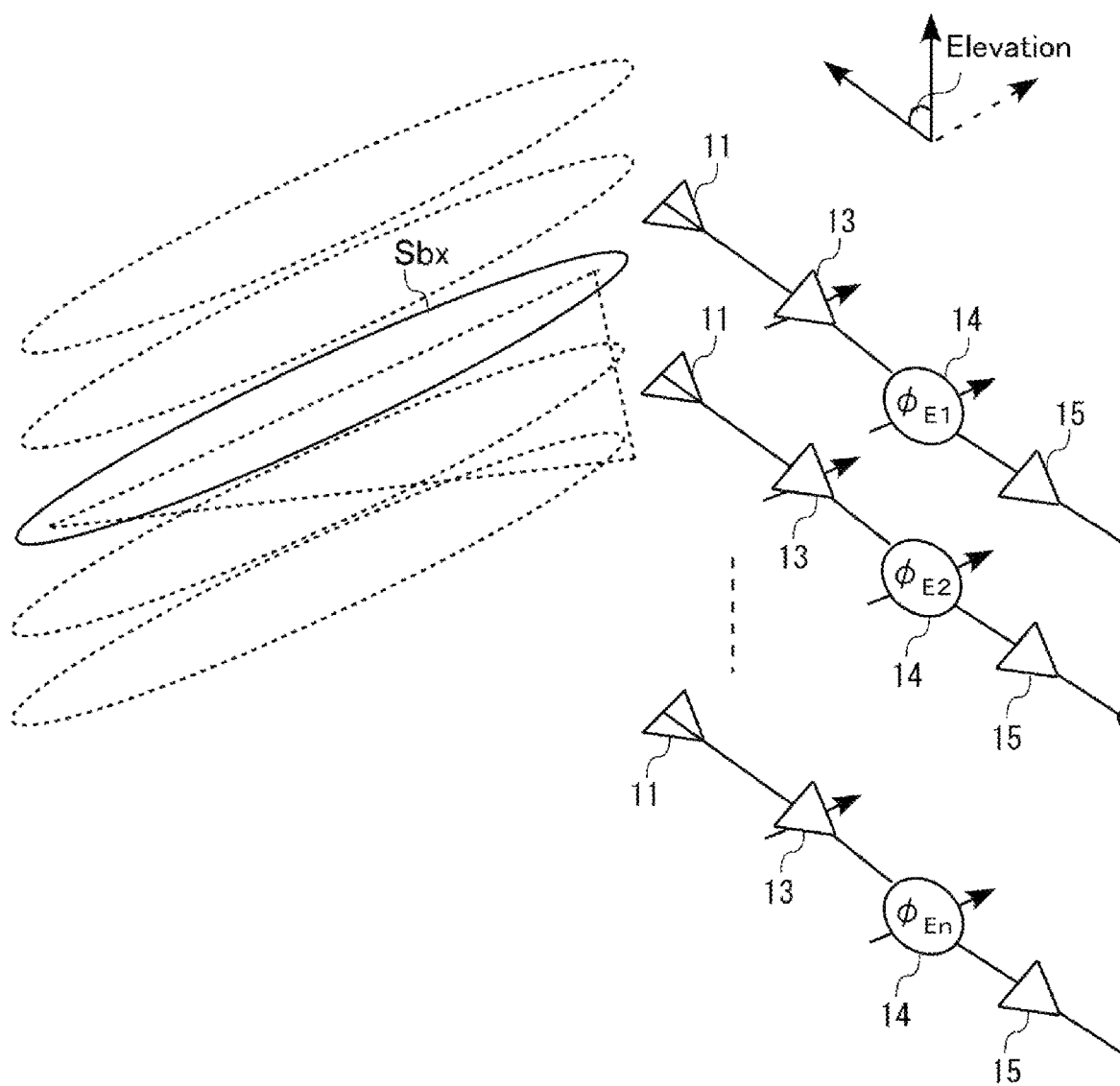
FIG. 11 is an explanatory diagram of a reception beam region according to a fifth embodiment.

FIGS. 9 to 11 are explanatory views of a fifth embodiment. As illustrated in FIG. 9, the radar apparatus 501 of the fifth embodiment scans along the directions of the azimuth angle (Azimuth) and the elevation angle (Elevation) to provide a 2D scan configuration that outputs IF signals of four reception channels Rx1 to Rx4, which is calculated by 2×2, from the mixer 9 An example of four reception channels Rx1 to Rx4 that are 2 by 2 channels is shown, but the present embodiment may not be limited to this.

For example, by installing n sub-array antenna elements 11 in the azimuth angle direction as shown in FIG. 10 and n sub-array antenna elements 11 in the elevation angle direction as shown in FIG. 11, the scanning direction by the sub-array antenna element 11 can be set to the 2D directions, so that calculations can be performed for the scan ranges Sbx and Sby, respectively.

The signal processing unit 3 executes 2DFFT processing on digital data using FFT3b for the IF signal obtained along the azimuth direction, executes the CFAR (Constant false alarm rate) algorithm, and calculates a difference between the sum signal level Σ and the signal level Δ.

Further, the signal processing unit 3 executes 2DFFT processing on digital data using FFT3b for the IF signal obtained along the elevation angle direction, executes the CFAR (Constant false alarm rate) algorithm, and calculates the sum signal level Σ and the difference signal level Δ. In the signal processing unit 3, the angle difference θ between the receiving direction of the received pulse beam and the existing direction of the target depends on the ratio of the sum signal level Σ and the difference signal level Δ as shown in the above equation (1), so that the unit 3 can measure using the mono-pulse method with utilizing the fact that the angle difference θ is a function of the ratio.

According to the present embodiment, a plurality of IF signals having the number of 2×2 or more can be output from the mixer 9 by scanning along the directions of the azimuth angle and the elevation angle by the 2D scan configuration. Therefore, the 2D scan process can be realized by using the sub-array antenna element 11, and the process suitable for the mono-pulse process and the DBF process can be performed.

Sixth Embodiment

Figure 12:
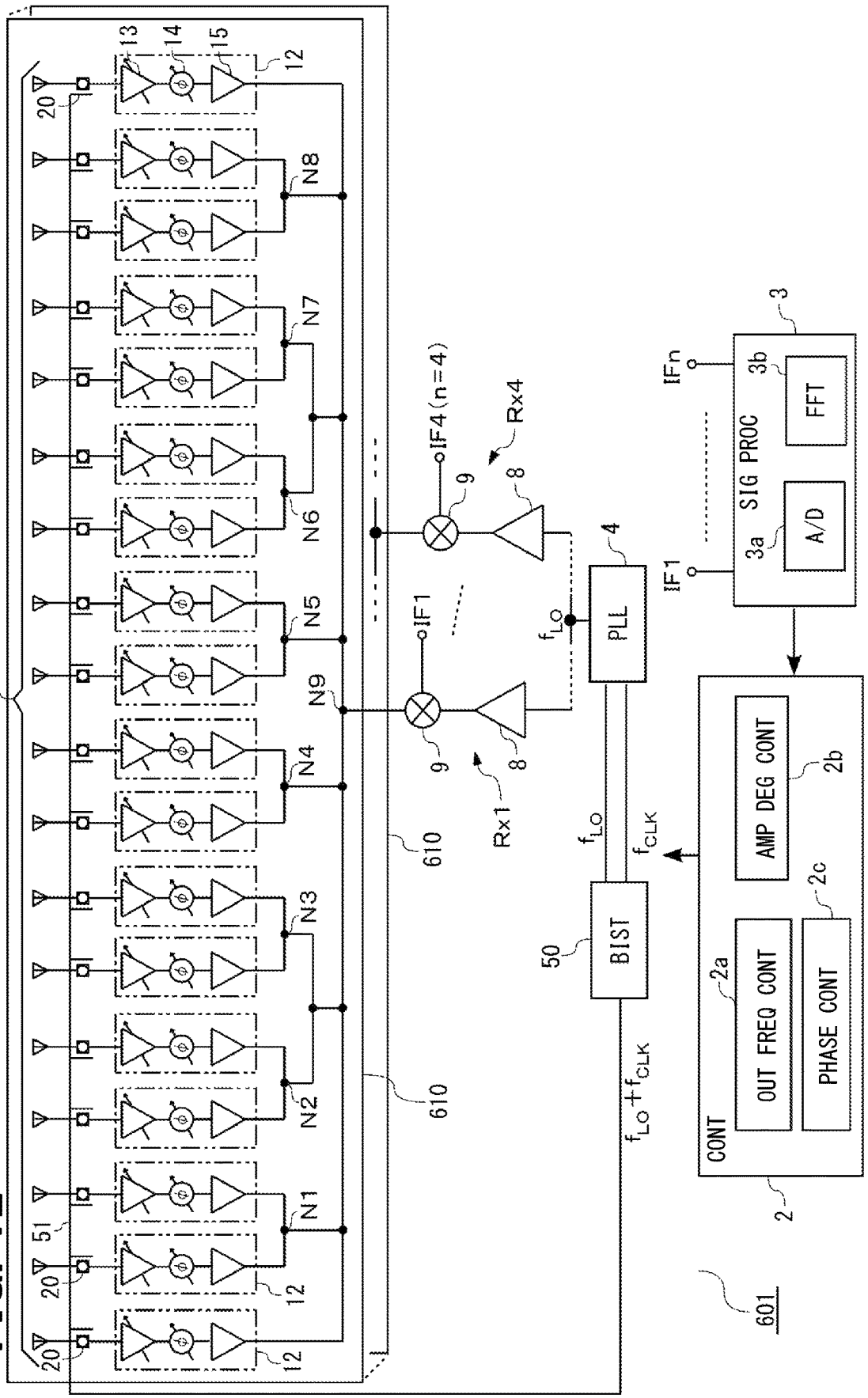
FIG. 12 is an electrical configuration diagram of a self-diagnosis system of a radar device according to a sixth embodiment.

FIG. 12 shows an explanatory diagram of a sixth embodiment. The radar device 601 of the sixth embodiment includes a self-diagnosis function for self-diagnosing the reception channels Rx1 to Rx4, and further includes a self-diagnosis signal generation unit 50 in the configuration described in the above-described embodiment.

The PLL 4 generates a Built-In Self Test (BIST) local signal having the same frequency as the local signal and outputs it to the self-diagnosis signal generation unit 50. The self-diagnosis signal generation unit 50 is configured to include a frequency mixer for BIST, and inputs a local signal for BIST and a clock signal CLK that is a test signal having a lower frequency than the local signal from PLL4, and generates a millimeter-wave band self-diagnosis signal (i.e., a on-chip test signal) by up-converting the BIST local signal and the clock signal CLK using the BIST frequency mixer, and inputs it into the PAD coupler 20 at the receiving end of the phased array antenna 307 through the transmission line 51.

The mixer 9 synthesizes and inputs the self-diagnosis signal input to the PAD coupler 20 via a large number of high frequency units 12, mixes it with the local signal of the PLL 4, and outputs it to the signal processing unit 3 as an IF signal.

A complete synchronization system is obtained by generating the BIST local signal and the clock signal CLK (having, for example, $f_{LO}$=77 GHz and $f_{CLK}$=10 MHz) and the local signal of the reception unit 6 (having $f_{LO}$=77 GHz) from the same PLL4. The IF frequency of the on-chip BIST signal appearing in the IF output of the mixer 9 is $|f_{BIST\_RF} - f_{LO}|$=|(77 GHz±10 MHz)−77 GHz|=10 MHz, but high frequency accuracy can be realized.

Further, as an example of phase inspection, any two first phase shifters 14 are turned on from the branch path of the phased array antenna 307, and the phase of one of the first phase shifters 14 is swept from 0° to 360°, so that the level of the on-chip BIST signal described above can be changed. The signal strength is maximized when the phases of the signals input through both of the branch paths are in phase, and the signal strength is minimized when the signals are out of phase. Taking advantage of these features, self-diagnosis regarding the phase control of the first phase shifter 14 can be performed. The self-diagnosis technique by the self-diagnosis signal generation unit 50 utilizes the technique of Japanese Patent Application No. 2020-1389 already filed by the applicant of the present application and incorporated herein by reference.

Further, even if the frequency of the local signal generated by the PLL 4 varies in PVT, the frequency change between the local signal output by the PLL 4 to the mixer 9 and the signal output by the PLL 4 to the self-diagnosis signal generation unit 50 is the same. Therefore, a self-diagnosis signal that can cancel these changes can be generated, and self-diagnosis can be performed with high reliability.

Seventh Embodiment

Figure 13:
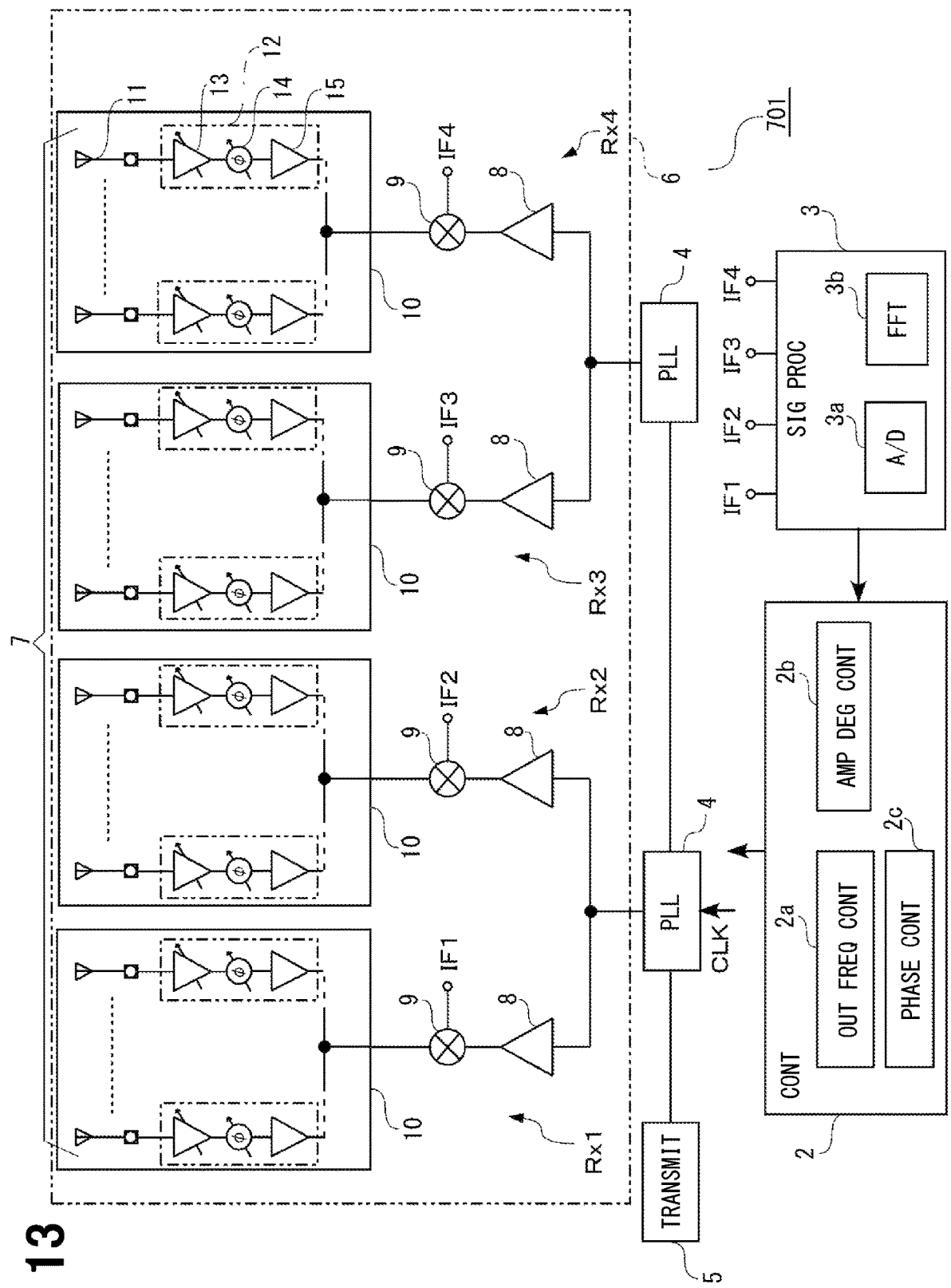
FIG. 13 is an electrical configuration diagram of a radar device according to a seventh embodiment.

FIG. 13 shows an explanatory diagram of a seventh embodiment. The radar device 701 of the seventh embodiment includes a plurality of PLLs 4. The plurality of PLLs 4 operate one of them as a master and the other as a slave, generate local signals in a state of being synchronized with each other, and output the local signals to the mixer 9 of each receiving channel Rx1 to Rx4. The plurality of PLLs 4 can synchronize the output local signals, and can synchronously output the local signals to the mixers 9 of all the receiving channels Rx1 to Rx4. Even in such an embodiment, the same effects as those in the above-described embodiment can be obtained.

Other Embodiments

The present disclosure is not limited to the embodiments described above, but can be implemented by various modifications, and can be applied to various embodiments without departing from the spirit of the present disclosure. For example, the following modifications or extensions are possible.

It may be sufficient that at least one or more of all the receiving channels Rx includes the sub-array antenna element 11 having at least two branches or more.

The configurations and functions of the plural embodiments described above may be combined. A part of the above-described embodiment may be dispensed/dropped as long as the problem identified in the background is resolvable. In addition, various modifications of the present disclosure may be considered as encompassed in the present disclosure, as long as such modifications pertain to the gist of the present disclosure.

The present disclosure has been described in accordance with the embodiments. However, it is to be understood that the present disclosure is not limited to the embodiments and structure. The present disclosure is intended to cover various modification examples and equivalents thereof. In addition, various modes/combinations, one or more elements added/subtracted thereto/therefrom, may also be considered as the present disclosure and understood as the technical thought thereof.

In the drawings, 1, 201, 301, 401, 501, 601, 701 are radar devices, 4 are PLLs, 7, 307 are phased array antennas, 11, 11a to 11i are sub-array antenna elements, 12 are high frequency parts, and 13 are variable gain amplifiers, 14 is a first phase shifter, 21 is a third phase shifter, 22 is a second phase shifter, and 50 is a self-diagnosis signal generator.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A radar device for a vehicle comprising:
two or more receiving channels, each of which includes a mixer, wherein:
at least one or more of the receiving channels includes:
a phased array antenna divided into at least two or more branches to provide sub-array antenna elements; and
one or more first phase shifters and a variable gain amplifier as a high frequency unit disposed between each of the sub-array antenna elements and the mixer;
the sub-array antenna elements in the phased array antenna include at least one grouping element in which two or more sub-array antenna elements are grouped and at least one non-grouping element having a single sub-array antenna element which is not grouped;
a total numerical number of the sub-array antenna elements in the at least one grouping element and the at least one non-grouping element is greater than a numerical number of the one or more first phase shifters;
the at least one or more of the receiving channels further includes a second phase shifter; and
the sub-array antenna elements, the variable gain amplifier, the one or more first phase shifters, the second phase shifter, and the mixer are arranged in this order.

2. The radar device according to claim 1, further comprising:
a PLL that generates a local signal to be supplied to the mixer, wherein:
a same one PLL supplies the local signal to the mixers of all the receiving channels.

3. The radar device according to claim 1, wherein:
the high frequency unit includes the variable gain amplifier arranged between the first phase shifter and the sub-array antenna element.

4. The radar device according to claim 1, further comprising:
a PLL that generates a local signal to be supplied to the mixer; and
a self-diagnosis signal generation unit that generates
a BIST local signal having a same frequency as the local signal and a test signal having a lower frequency than the local signal using a same PLL, generates a self-diagnosis signal in a millimeter-wave band by performing an up-conversion of the test signal and the BIST local signal using a BIST frequency mixer, and inputs the self-diagnosis signal into a receiving end of the phased array antenna.

5. The radar device according to claim 1, wherein:
the two or more receiving channels provide a 2D scan configuration which outputs a plurality of IF signals with the number of 2 by 2 or more from the mixer by scanning along an azimuth direction and an elevation direction.

6. The radar device according to claim 1, further comprising:
a plurality of PLLs that generate a local signal to be supplied to the mixer, wherein:
the plurality of PLLs synchronously output the local signal to the mixer of all the receiving channels by synchronizing the local signal to be output.

7. The radar device according to claim 1, wherein the numerical number of the one or more first phase shifters is greater than a total numerical number of mixers in each of the two or more receiving channels.

8. The radar device according to claim 1, wherein the second phase shifter is disposed between the high frequency unit and the mixer.

9. The radar device according to claim 8, further comprising:
one or more PLLs that generate a local signal to be supplied to the mixer;
wherein the at least one or more of the receiving channels further includes a third phase shifter disposed between the mixer and the one or more PLLs.

* * * * *